United States Patent Office 2,757,127
Patented July 31, 1956

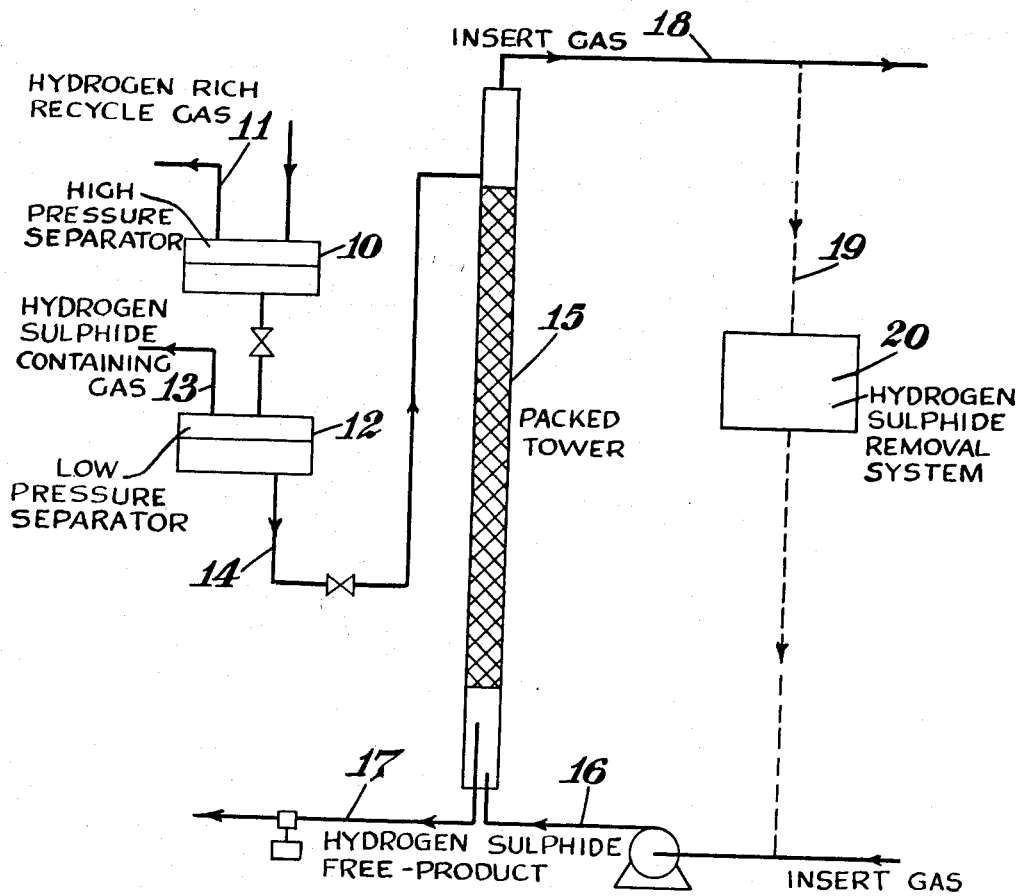

2,757,127
STRIPPING HYDROGEN SULPHIDE FROM HYDROFINED PETROLEUM HYDROCARBONS WITH AN INERT GAS

Frederick William Bertram Porter and Roy Purdy Northcott, Sunbury-on-Thames, England, assignors to The British Petroleum Company Limited Application November 12, 1953, Serial No. 391,685
Claims priority, application Great Britain November 18, 1952

4 Claims. (Cl. 196—24)

This invention relates to the removal of hydrogen sulphide from petroleum hydrocarbons and more particularly to petroleum products which have been subjected to elevated temperature.

In hydrocatalytic desulphurisation processes wherein a feedstock containing organically combined sulphur is treated with hydrogen at elevated temperature and pressure in the presence of a sulphur-resistant hydrogenation catalyst, whereby the organically combined sulphur is converted into hydrogen sulphide, some or all of which is dissolved in the liquid product, it is necessary to remove the hydrogen sulphide before a marketable product is obtained. A conventional method of removing the dissolved hydrogen sulphide from the liquid hydrocarbons is to pass the product to a stabilising column where the product is heated and the hydrogen sulphide removed overhead with or without light hydrocarbons. Substantially complete hydrogen sulphide removal can be achieved by this means in a properly designed column but in other cases only partial removal of the hydrogen sulphide is carried out in the column and the residual hydrogen sulphide then removed by caustic soda or other basic solutions. Alternatively the whole of the hydrogen sulphide can be removed by the use of basic solutions but this requires two or more washing stages. In the large majority of cases it has been found that the products, from which the hydrogen sulphide has been removed by the above mentioned methods, are marginally positive to the doctor test although they generally sweeten on storage through reaction with traces of oxygen. With a large number of petroleum products the above method of treatment is therefore satisfactory but in some cases, where a stringent corrosion test has to be passed (B. S. I. copper strip test), this method of removal of hydrogen sulphide does not give a satisfactory product.

In all processes, including catalytic desulphurisation where hydrogen sulphide is evolved, the hydrocarbons have to be subjected to thermal treatment to a greater or lesser degree and consequently traces of olefins are formed. Under the conditions normally used for the removal of hydrogen sulphide in a tower, temperatures above 100° C. are employed and under these conditions hydrogen sulphide will react with olefins to form mercaptans, a reaction which is catalysed by iron sulphide present in the equipment. Although these mercaptans may subsequently be converted to disulphides or other sulphur compounds on storage, thus giving a doctor sweet product, it has been found that in some cases the products do not pass the B. S. I. corrosion test presumably due to the breakdown of these disulphides or other sulphur compounds under the conditions of the test. In addition it is known that the washing of products, from the above mentioned processes with caustic soda (basic) solutions tends to promote the formation of mercaptans and other sulphur compounds when the concentration of sodium sulphide is high and hydrogen sulphide is also present. Furthermore, it is thought that the use of caustic solutions (basic solutions) will tend to remove traces of natural inhibitors of the phenolic type, it being known that inhibitors of that type tend to reduce the reactions of sulphur compounds in the B. S. I. test.

According to the present invention, hydrogen sulphide is removed from a petroleum fraction by the passage therethrough of a gas which is essentially free of hydrogen sulphide, oxygen or oxygen compounds reactive with hydrogen sulphide, at a temperature such that there is no reaction between the hydrogen sulphide and compounds present in the fraction that react with hydrogen sulphide at elevated temperatures to form mercaptans.

Not only is the formation of mercaptans avoided by this method of removing hydrogen sulphide but the removal of natural inhibitors is also avoided.

In general, the stripping temperature should be kept below 100° C.

The stripping gas may be any gas which does not contain hydrogen sulphide, oxygen or oxygen compounds reactive with hydrogen sulphide at the stripping temperature. For example, in the autofining process, the excess hydrogen-containing gases freed of hydrogen sulphide may be used.

The quantity of gas used for stripping may be varied by continuous recycle after passing through a washing stage to remove hydrogen sulphide.

The application of the invention to a hydrocatalytic desulphurisation process is diagrammatically illustrated in the accompanying drawing.

The petroleum hydrocarbons issuing from the hydrocatalytic reactor are cooled while still under plant pressure and are passed first to a high pressure separator 10, from which a hydrogen-rich recycle gas is removed via line 11, the bulk of the hydrogen sulphide remaining dissolved in the liquid hydrocarbons, and then, after reduction of pressure, to a low pressure separator 12 from which a hydrogen sulphide-containing gas is removed via line 13 and burnt or passed to a sulphur recovery unit. The product leaving the low pressure separator 12 via line 14 contains the remainder of the hydrogen sulphide, and in accordance with the present invention it is passed to the top of a packed tower 15 down which it passes downwardly in countercurrent to a stream of inert gas introduced into the tower via line 16. If desired, the product leaving the high pressure separator 10 may be passed, after reduction of pressure, direct to the tower 15. The product, entirely free from hydrogen sulphide, leaves the tower 15 via line 17 while the inert gas leaves the tower via line 18 and is burnt or otherwise disposed of. If desired, the inert gas leaving the tower 15 by line 18 may be recycled via line 19 and system 20 for the removal and recovery of hydrogen sulphide.

The following example shows the relative merits of the various methods of hydrogen sulphide removal. A petroleum fraction of ca. 140–200° C. A. S. T M. boiling range was autofined under the following conditions:

Pressure _____ 100 p. s. i. ga.
Temperature _____ 780° F.
Space velocity _____ 3.0 v./v./hr.
Recycle rate _____ 2000 S. C. F./B.
Catalyst _____ mixed molybdenum and cobalt oxides on alumina The general properties of the feedstock and product were:

| | Feed | Product |
|---|---|---|
| S. G. | 0.777 | 0.777 |
| I. B. P., ° C. | 147 | 145 |
| 10% vol. at ° C. | 158.5 | 157.5 |
| 50% vol. at ° C. | 169 | 169.5 |
| 90% vol. at ° C. | 187 | 188.5 |
| F. B. P. | 204.5 | 205 |
| Bromine No. | 0.8 | 2.4 |
| Sulphur, percent wt. total | 0.132 | 0.002 |

The product from the plant was treated in various ways for the removal of hydrogen sulphide and was then distilled with steam to give a specification product. The finished product gave the following reactions to the B. S. I. copper strip test:

| Method of H₂S removal | Blown out with nitrogen in cold | Washed with 2½% vol. caustic soda solution | Stripped at 100 to 150° C. and washed with 10% vol. caustic soda solution | Partially stripped in cold and washed with 10% volume caustic soda solution |
| --- | --- | --- | --- | --- |
| B. S. I. Copper Strip Test | Pass | Fail | Fail | Fail |

Only in the case where the product was freed of hydrogen sulphide by stripping in the cold with a stream of nitrogen was a satisfactory product obtained.

We claim:

1. A process for producing petroleum hydrocarbons passing the B. S. I. copper strip corrosion test from petroleum hydrocarbons originally containing organically combined sulphur which have been treated with hydrogen-containing gases at elevated temperature and pressure in the presence of a sulphur-resistant hydrogenation catalyst, whereby the organically combined sulphur in the hydrocarbons has been converted into hydrogen sulphide, the treated hydrocarbons containing hydrogen sulphide and compounds reactive with hydrogen sulphide at elevated temperatures to form mercaptans, which comprises passing through the treated hydrocarbons a gas which is essentially free of hydrogen sulphide, oxygen and oxygen compounds reactive with hydrogen sulphide, at a temperature not exceeding 100° C. such that there is no reaction between the hydrogen sulphide and said compounds present in the hydrocarbons that react with hydrogen sulphide at elevated temperatures to form mercaptans.

2. A process according to claim 1, wherein said gas consists of part of the hydrogen-containing gases used for treating the petroleum hydrocarbons, if necessary after removal of hydrogen sulphide therefrom.

3. A process according to claim 1, wherein said gas consists of nitrogen.

4. A process as claimed in claim 1, wherein said gas consists of nitrogen passed through the treated hydrocarbons at room temperature.

References Cited in the file of this patent

UNITED STATES PATENTS

| | | |
| --- | --- | --- |
| 1,872,349 | Sachs | Aug. 16, 1932 |
| 1,911,795 | Brooks | May 30, 1933 |
| 1,921,478 | Pier | Aug. 8, 1933 |
| 2,671,754 | De Rosset et al. | Mar. 9, 1954 |